United States Patent
Aoki et al.

(10) Patent No.: US 9,725,127 B2
(45) Date of Patent: Aug. 8, 2017

(54) FRONT WHEEL SUPPORTING FRAME STRUCTURE OF SADDLE-RIDE VEHICLE

(71) Applicant: HONDA MOTOR CO., LTD., Tokyo (JP)

(72) Inventors: Koji Aoki, Wako (JP); Daisuke Kuramochi, Wako (JP); Tatsuya Suzuki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/077,907

(22) Filed: Mar. 23, 2016

(65) Prior Publication Data

US 2016/0288862 A1  Oct. 6, 2016

(30) Foreign Application Priority Data

Mar. 30, 2015  (JP) .................................. 2015-069531

(51) Int. Cl.

| | | |
|---|---|---|
| *B62K 21/02* | (2006.01) | |
| *B62K 11/12* | (2006.01) | |
| *B62K 25/24* | (2006.01) | |
| *B62K 11/04* | (2006.01) | |
| *B62K 19/24* | (2006.01) | |

(Continued)

(52) U.S. Cl.
CPC .............. *B62K 21/02* (2013.01); *B62K 11/04* (2013.01); *B62K 11/12* (2013.01); *B62K 19/24* (2013.01); *B62K 21/18* (2013.01); *B62K 21/22* (2013.01); *B62K 25/24* (2013.01)

(58) Field of Classification Search
CPC ........ B62K 21/02; B62K 25/24; B62K 21/22; B62K 19/24; B62K 21/18; B62K 11/04; B62K 11/12
See application file for complete search history.

(56) References Cited

U.S. PATENT DOCUMENTS

| | | | | |
|---|---|---|---|---|
| 4,638,881 A | * | 1/1987 | Morioka | ................ B62K 11/04 180/219 |
| 4,723,620 A | * | 2/1988 | Ono | ....................... B62J 11/005 180/219 |

(Continued)

FOREIGN PATENT DOCUMENTS

| | | | |
|---|---|---|---|
| JP | 03287481 A | * | 12/1991 |
| JP | 03287482 A | * | 12/1991 |
| JP | 2012-183882 | | 9/2012 |

*Primary Examiner* — Darlene P Condra
(74) *Attorney, Agent, or Firm* — Mori & Ward, LLP

(57) ABSTRACT

A front wheel supporting frame structure of a saddle-ride vehicle includes a main frame, upper and lower arms and a lower frame. The main frame has a front portion and a rear portion. The main frame includes an upper connection portion, a lower connection portion, and an extending portion. The extending portion extends downward. The upper arm has an upper front end portion and an upper rear end portion. The upper rear end portion is movably connected to the upper connection portion. The lower arm has a lower front end portion and a lower rear end portion. The lower rear end portion of is movably connected to the lower connection portion. The lower frame includes a bottom portion and an upright portion. The bottom portion extends in the vehicle front-rear direction. The upright portion has a top portion connected to the extending portion.

20 Claims, 7 Drawing Sheets

(51) Int. Cl.
   *B62K 21/18*   (2006.01)
   *B62K 21/22*   (2006.01)

(56) References Cited

U.S. PATENT DOCUMENTS

| | | | | |
|---|---|---|---|---|
| 4,747,952 A * | 5/1988 | Nakano | ................... | A61M 1/30 210/104 |
| 4,756,547 A * | 7/1988 | Trema | ................... | B62K 21/005 180/219 |
| 4,785,905 A * | 11/1988 | Trema | ................... | B62K 21/005 180/219 |
| 4,807,898 A * | 2/1989 | Huntly | ................... | B62K 25/24 280/276 |
| 4,821,833 A * | 4/1989 | Yamaguchi | .......... | B62K 25/005 180/219 |
| 5,248,012 A * | 9/1993 | Kurawaki | ............. | B62K 11/02 180/219 |
| 5,361,864 A * | 11/1994 | Tanaka | ................... | B62K 25/24 180/219 |
| 5,782,313 A * | 7/1998 | Kurawaki | ............. | B62K 25/24 180/219 |
| 6,263,994 B1 * | 7/2001 | Eitel | ....................... | F16F 9/342 180/219 |
| 7,806,217 B2 * | 10/2010 | Hasegawa | ........... | B62K 21/005 180/219 |
| 2008/0236925 A1* | 10/2008 | Hasegawa | ............... | B62K 25/24 180/227 |
| 2009/0243248 A1* | 10/2009 | Nakamura | ............... | B60G 3/20 280/124.135 |
| 2010/0096207 A1* | 4/2010 | Nagao | ................... | B62K 25/24 180/223 |
| 2014/0167381 A1* | 6/2014 | Ishii | ..................... | B62K 21/005 280/279 |
| 2014/0167383 A1* | 6/2014 | Lasher, III | ............. | B62K 19/00 280/281.1 |
| 2014/0183836 A1* | 7/2014 | Ishii | ....................... | B62K 25/08 280/267 |

* cited by examiner

FRONT WHEEL SUPPORTING FRAME STRUCTURE OF SADDLE-RIDE VEHICLE

CROSS-REFERENCE TO RELATED APPLICATIONS

The present application claims priority under 35 U. S. C. §119 to Japanese Patent Application No. 2015-069531, filed Mar. 30, 2015, entitled "FRONT WHEEL SUPPORTING FRAME STRUCTURE OF SADDLE-RIDE TYPE VEHICLE." The contents of this application are incorporated herein by reference in their entirety.

BACKGROUND OF THE INVENTION

Field of the Invention

The present invention relates to a front wheel supporting frame structure of a saddle-ride type vehicle.

Discussion of the Background

Conventional front wheel supporting frame structures of saddle-ride type vehicles include one disclosed in, for example, Japanese Patent Laid-Open No. 2012-183882. The front wheel supporting frame structure of Japanese Patent Laid-Open No. 2012-183882 includes upper and lower arms which extend in vehicle front-rear directions and by which a front wheel is supported to be swingable in up-down directions, in which rear end portions of the upper and lower arms are supported by a front portion of a main frame, and a lower end portion of a cushion member is connected to the lower arm.

SUMMARY OF THE INVENTION

According to one aspect of the present invention, a front wheel supporting frame structure of a saddle-ride vehicle includes a main frame, upper and lower arms, a lower frame, an upper connection portion, an extending portion, a lower connection portion, and an upper front portion. The main frame extends in vehicle front-rear directions. The upper and lower arms extend in the vehicle front-rear directions. A front wheel is supported to be swingable in up-down directions by the upper and lower arms. The lower frame extends forward in a vehicle lower portion from a rear portion of the main frame and then extends upward in a vehicle front portion. The upper connection portion is formed in an upper front portion of the main frame. A rear end portion of the upper arm is swingably connected to the upper connection portion. The extending portion extending downward is formed in a lower front portion of the main frame. The lower connection portion is formed in the extending portion. A rear end portion of the lower arm is swingably connected to the lower connection portion. The upper front portion of the lower frame is connected to the extending portion.

According to another aspect of the present invention, a front wheel supporting frame structure of a saddle-ride vehicle includes a main frame, an upper arm, a lower arm, and a lower frame. The main frame has a front portion and a rear portion opposite to the front portion in a vehicle front-rear direction. The main frame includes an upper connection portion, a lower connection portion, and an extending portion. The upper connection portion is provided at an upper part of the front portion. The lower connection portion is provided at a lower part of the front portion. The extending portion extends downward from the lower connection portion. The upper arm has an upper front end portion and an upper rear end portion opposite to the upper front end portion in the vehicle front-rear direction. The upper arm supports at the upper front end portion a front wheel to be movable in an up-down direction substantially perpendicular to the vehicle front-rear direction. The upper rear end portion of the upper arm is movably connected to the upper connection portion of the main frame. The lower arm is provided under the upper arm. The lower arm has a lower front end portion and a lower rear end portion opposite to the lower front end portion in the vehicle front-rear direction. The lower arm supports at the lower front end portion a front wheel to be movable in the up-down direction. The lower rear end portion of the lower arm is movably connected to the lower connection portion of the main frame. The lower frame includes a bottom portion and an upright portion which are connected at a corner portion. The bottom portion extends in the vehicle front-rear direction from the rear portion of the main frame to the corner portion. The upright portion has a top portion opposite to the corner portion in the up-down direction. The top portion is connected to the extending portion of the main frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
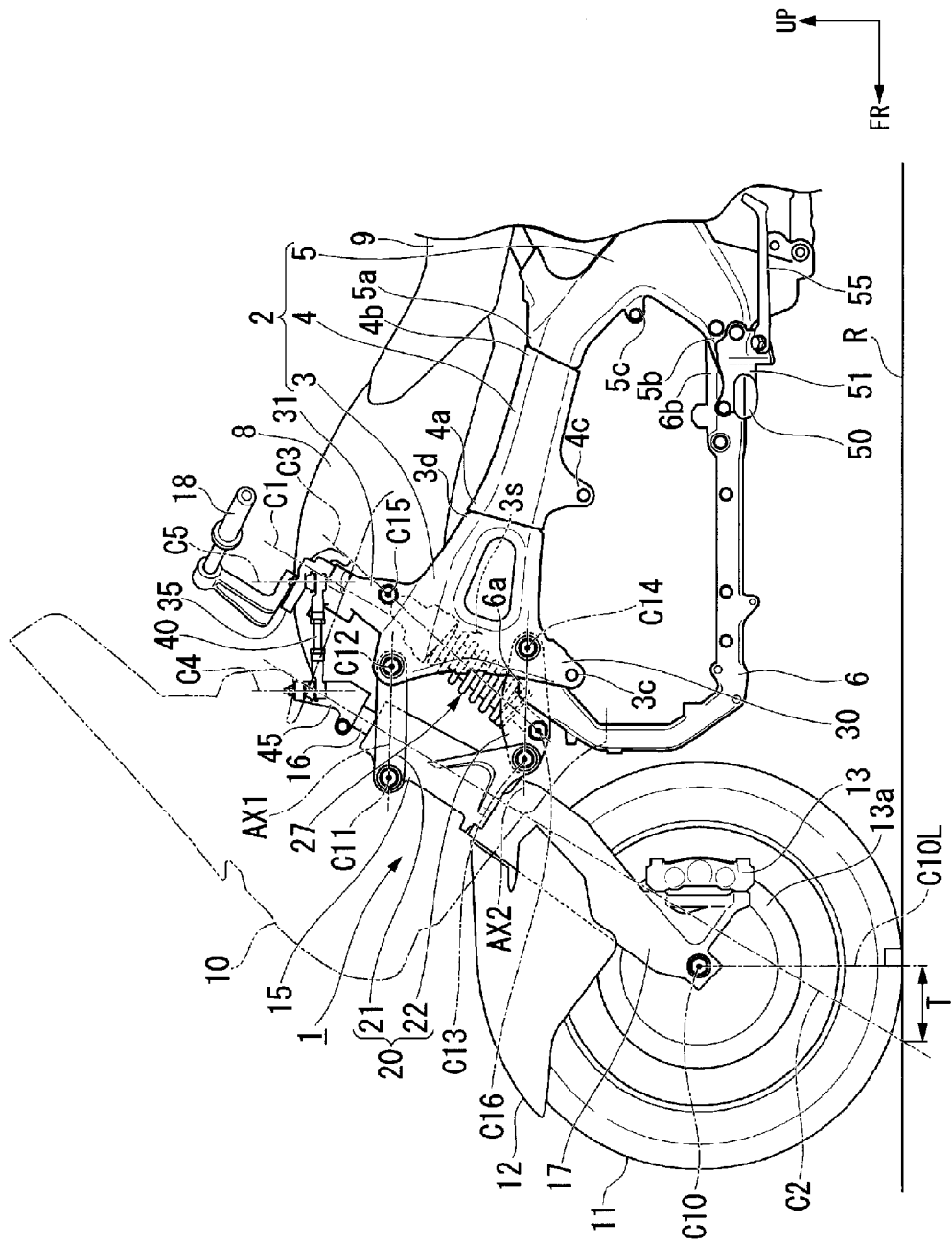
FIG. 1 is a left-side view of a vehicle body front portion of a motorcycle in an embodiment of the present invention.

The embodiments will now be described with reference to the accompanying drawings, wherein like reference numerals designate corresponding or identical elements throughout the various drawings.

An embodiment of the present invention is described below with reference to the drawings. Directions such as front, rear, left, right, and the like in the following description are the same as directions in a vehicle described below, unless specifically stated otherwise. Moreover, an arrow FR indicating a front side of the vehicle, an arrow LH indicating a left side of the vehicle, an arrow UP indicating an upper side of the vehicle, and a center line CL in vehicle left-right directions are illustrated in appropriate portions of the drawings used in the following description.

<Entire Vehicle>

FIG. 1 illustrates a vehicle body front portion of a motorcycle which is an example of a saddle-ride type vehicle. Referring to FIG. 1, a vehicle body frame of the motorcycle includes a pair of left and right main frames 2 which extend in vehicle front-rear directions and which include front blocks 3 supporting a front wheel suspension device 1 in a front end portion thereof. Reference sign 2L in FIG. 2 denotes the left main frame, and reference sign 2R denotes the right main frame. Moreover, reference sign 3L in FIG. 2 denotes a left front block, and reference sign 3R denotes a right front block.

The left and right main frames 2 each integrally include: the front block 3 formed in a shape whose width in up-down directions increases toward the front side in a side view; a pivot portion 5 supporting a not-illustrated rear suspension device and formed in a V-shape whose width in the up-down directions increases toward the front side and which is open to the front; and a connection portion 4 extending rearward from a rear end 3d of the front block 3 while gently inclining downward and connecting the rear end 3d of the front block 3 and an upper front end 5a of the pivot portion 5 to each other. Note that the width of a front end 4a of the connection portion 4 in the up-down directions is substantially the same as the width of the rear end 3d of the front block 3 in the up-down directions. Moreover, the width of the rear end 4b of the connection portion 4 in the up-down directions is substantially the same as the width of the upper front end 5a of the pivot portion 5 in the up-down directions.

The vehicle body frame further includes a pair of left and right lower frames 6 which have a J-shape in the side view. The lower frames 6 extend forward in a vehicle lower portion from lower front end portions 5b of the pivot portions 5 located in rear portions of the main frames 2, and then extend upward in a vehicle front portion to reach lower front end portions of the front blocks 3. Reference sign 6L in FIG. 2 denotes the left lower frame, and reference sign 6R denotes the right lower frame.

For example, an engine is mounted in a space surrounded by the main frames 2 and the lower frames 6. A fuel tank 8 is arranged above the front blocks 3 and the connection portions 4. A seat 9 is arranged above the pivot portions 5. The vehicle body front portion of the motorcycle is covered with a front cowl 10 made of synthetic resin.

Figure 2:
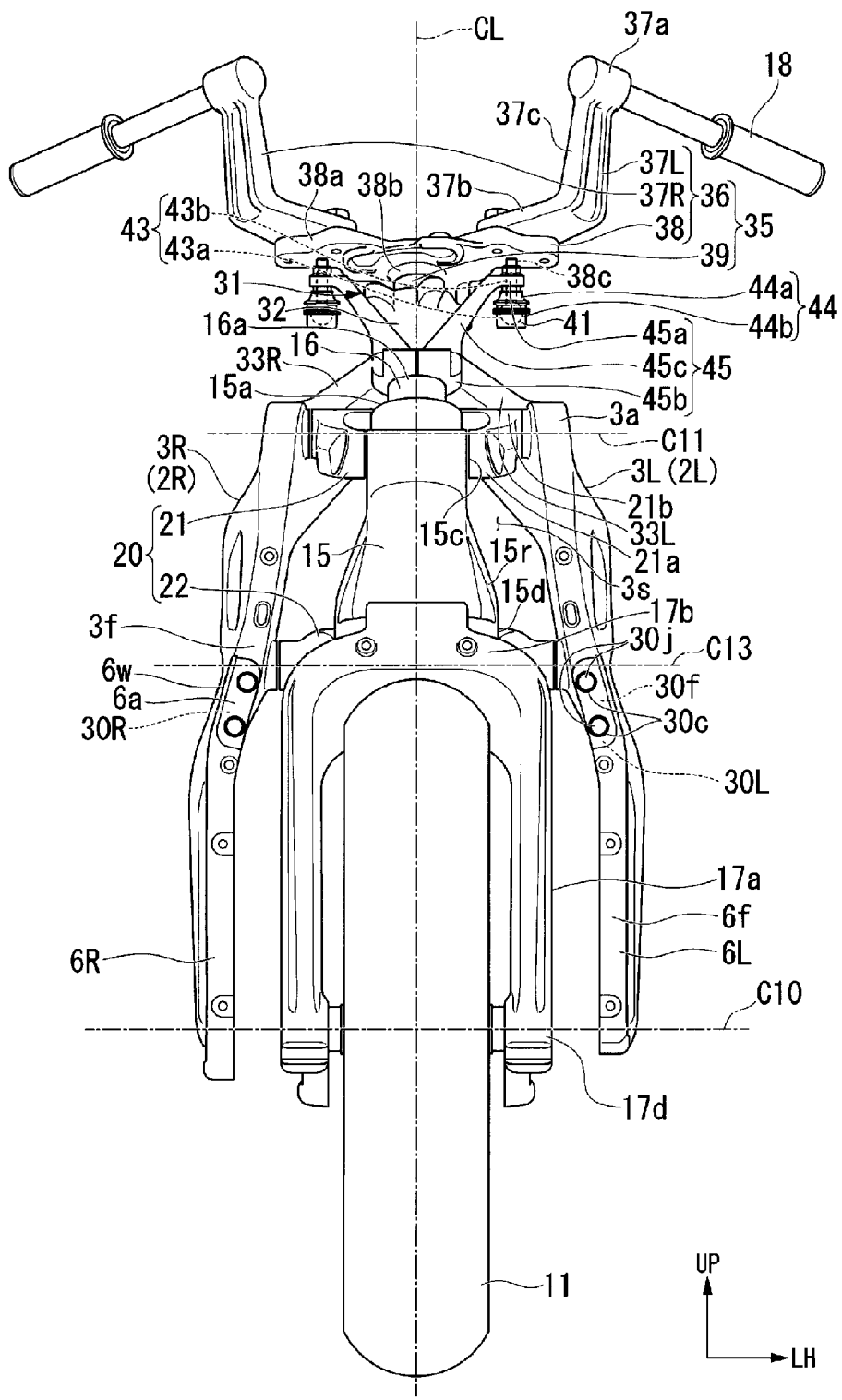
FIG. 2 is a front view of the vehicle body front portion of the aforementioned motorcycle.

Referring also to FIG. 2, a set of the front blocks 3 is formed in a gate shape (inverted V-shape) whose width in the left-right directions decreases toward the upper side in a front view and which is open downward. A lower open portion in the gate shape of the set of front blocks 3 is denoted by reference sign 3s.

Figure 4:
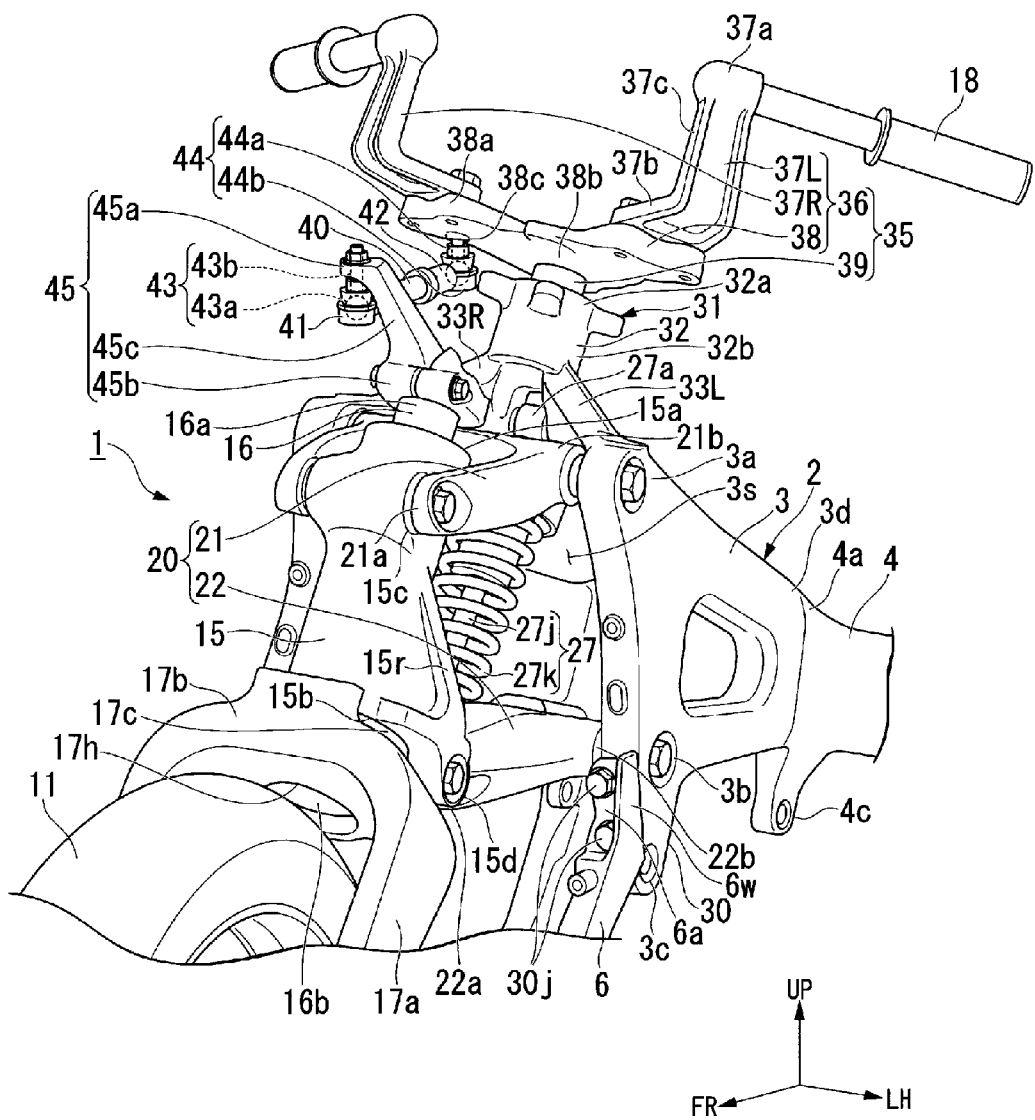
FIG. 4 is a perspective view of a front wheel suspension device of the aforementioned motorcycle as viewed from a front left side of the motorcycle and is a view in which a left link member is omitted.

Referring also to FIG. 4, upper connection portions 3a to which rear end portions 21b of an upper arm 21 are connected are formed in upper front end portions of the front blocks 3. A handle supporting portion 31 supporting a bar handle 18 (handle) is formed in upper front portions of the front blocks 3, behind the upper connection portions 3a, to extend rearward and upward. Extending portions 30 extending forward and downward are formed in lower front portions of the front blocks 3. Reference sign 30L in FIG. 2 denotes a left extending portion, and reference sign 30R denotes a right extending portion.

Lower connection portions 3b to which rear end portions 22b of a lower arm 22 are connected are formed in the extending portions 30, and upper front portions 6a of the lower frames 6 are connected to the extending portions 30. Lower supporting portions 3c supporting left and right upper portions of a front section of the engine are formed in lower end portions of the extending portions 30. Note that left and right upper portions of a center section of the engine in the front-rear directions are supported by supporting portions 4c of the connection portions 4, and left and right portions of a rear section of the engine are supported by supporting portions 5c of the pivot portions 5. Moreover, the lower frames 6 may support the engine.

In the front view, front end portions 6f of the left and right lower frames 6L, 6R linearly extend from a lower portion to an upper portion of the vehicle, and then incline toward the center in the vehicle width directions as extending upward to reach the upper front portions 6a. The upper front portions 6a of the left and right lower frames 6L, 6R overlap front portions 30f of the left and right extending portions 30L, 30R in the front view. The front portions 30f of the left and right extending portions 30L, 30R incline toward the center in the vehicle width directions as extending upward in the front view. Front end portions 3f of the left and right front blocks 3L, 3R are continuous with upper ends of the front portions 30f of the left and right extending portions 30L, 30R and gently incline toward the center in the vehicle width directions as extending upward in the front view.

The upper front portions 6a of the lower frames 6 are joined to the front portions 30f of the extending portions 30. Joining portions 30c to which the upper front portions 6a of the lower frames 6 are joined are formed in the front portions 30f of the extending portions 30. The upper front portions 6a of the lower frames 6 are joined to the joining portions 30c by using bolts 30j serving as fasteners for fastening the upper front portions 6a from the front side of the vehicle.

The multiple bolts 30j are provided while being offset from one another in the up-down directions and the left-right directions in the front view. In the embodiment, two bolts 30j are provided in each of the joining portions 30c of the left and right extending portions 30L, 30R to be offset from each other in the up-down directions and the left-right directions in the front view. Note that three or more bolts 30j may be provided.

Side wall portions 6w covering lateral sides of the bolts 30j in the side views are provided integrally with the upper front portions 6a of the lower frames 6. The side wall portions 6w are formed in plate shapes whose thickness direction coincides with the vehicle width directions, and extend in the front-rear directions. Covering the bolts 30j with the side wall portions 6w in the side views makes the joining portions 30c between the upper front portions 6a of the lower frames 6 and the front portions 30f of the extending portions 30 less visible in the side views, and the external appearance can be thereby improved.

Figure 7:
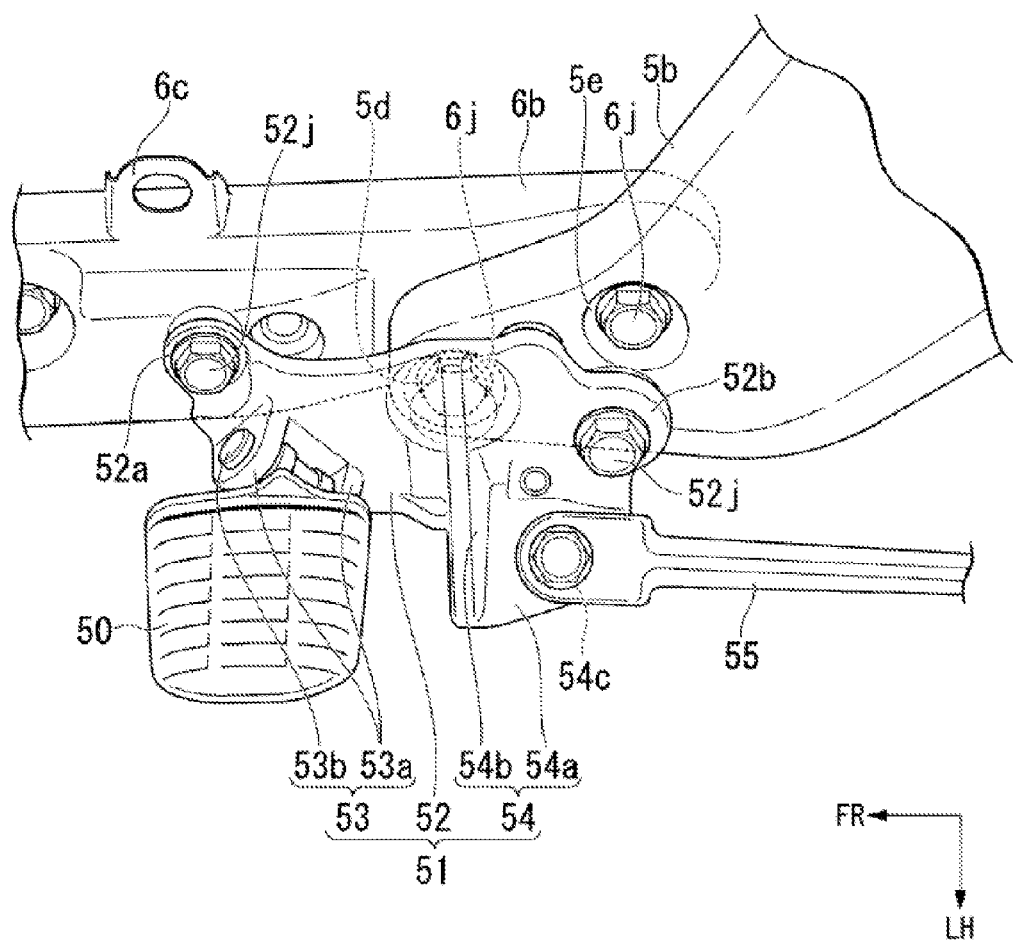
FIG. 7 is a perspective view of a joining portion between a rear end portion of a lower frame and a pivot portion of a main frame in the aforementioned front wheel suspension device, as viewed from an upper left side of the vehicle.

Referring also to FIG. 7, a rear end portion 6b of the lower frame 6 is separable from the lower front end portion 5b of the pivot portion 5. A first joining portion 5d serving as a joining portion between the rear end portion 6b of the lower frame 6 and the lower front end portion 5b of the pivot portion 5 is covered with a step supporting member 51 in the side view.

Specifically, the first joining portion 5d configured to be joined to the rear end portion 6b of the lower frame 6 is formed in a front end section of the lower front end portion 5b of the pivot portion 5. A second joining portion 5e configured to be joined to the rear end portion 6b of the lower frame 6 is formed behind and above the first joining portion 5d of the lower front end portion 5b of the pivot portion 5. The first joining portion 5d and the second joining portion 5e are fastened and fixed to the rear end portion 6b of the lower frame 6 by using fastening members such as bolts 6j.

The first joining portion 5d is covered with the step supporting member 51 in the side view. The second joining portion 5e is not covered with the step supporting member 51 in the side view and is exposed to the outside. Note that both of the first joining portion 5d and the second joining portion 5e may be covered with the step supporting member 51 in the side view. Alternatively, the first and second joining portions 5d, 5e may be configured such that the first joining portion 5d is not covered with the step supporting member 51 in the side view and is exposed to the outside while the second joining portion 5e is covered with the step supporting member 51 in the side view.

The step supporting member 51 integrally includes: a cover portion 52 formed in a plate shape which extends in the vehicle front-rear directions and whose thickness direction coincides with the vehicle width direction; a step supporting portion 53 supporting a step 50 on the left side of a front end portion of the cover portion 52; and a stand supporting portion 54 supporting a side stand 55 on the left side of a rear end portion of the cover portion 52.

A front joining portion 52a configured to be joined to the rear end portion 6b of the lower frame 6 is formed in an upper front end portion of the cover portion 52. The front joining portion 52a is fastened and fixed to the rear end portion 6b of the lower frame 6 by using a fastening member such as a bolt 52j.

A rear joining portion 52b configured to be joined to the lower front end portion 5b of the pivot portion 5 is formed in an upper rear end portion of the cover portion 52. The rear joining portion 52b is fastened and fixed to the lower front end portion 5b of the pivot portion 5 by using a fastening member such as a bolt 52j.

The step supporting member 51 is thus fixed to both of the rear end portion 6b of the lower frame 6 and the lower front end portion 5b of the pivot portion 5.

The step supporting portion 53 includes upper and lower shaft supporting portions 53a provided to branch from the front end portion of the cover portion 52 to protrude leftward therefrom and a cylindrical shaft portion 53b supported by the upper and lower shaft supporting portions 53a. The upper and lower shaft supporting portions 53a branch to hold a base end portion of the step 50 from above and below. The shaft portion 53b has a center axis inclined forward with respect to the vertical direction. The step 50 is connected to the shaft portion 53b to be turnable about the center axis of the shaft portion 53b.

The stand supporting portion 54 protrudes leftward from the rear end portion of the cover portion 52 and is formed in an L-shape in the side view. The stand supporting portion 54 integrally includes a first protruding portion 54a inclined leftward and downward and formed in a triangular shape whose width in the up-down directions increases toward the front side in the side view and a second protruding portion 54b extending in the up-down directions and formed in a triangular shape whose width in the left-right directions increases toward the lower side in the rear view, a lower end of the second protruding portion 54b connected to a front end of the first protruding portion 54a. A side stand connection portion 54c to which one end portion of the side stand 55 is turnably connected is formed in the first protruding portion 54a.

Note that reference sign 6c in the drawings denotes a supporting portion supporting a vehicle part near the engine.

<Front Wheel Suspension Device>

Referring also to FIGS. 1 and 4, the front wheel suspension device 1 includes: a front fork 17 which supports a front wheel 11 in a lower end portion thereof; a handle post 35 which is turnably supported by the handle supporting portion 31 and which is turned about a steering axis C1 with an operation of the bar handle 18; a supporting member 15 by which the front fork 17 is supported to be turnable about a steered axis C2; link members 40 and a steering member 45 which are connected to each other between the handle post 35 and the supporting member 15; a supporting arm 20 having the upper and lower arms 21, 22 which extend in the vehicle front-rear directions and by which the front wheel 11 is supported to be swingable in the up-down directions; and a cushion member 27 which is expanded and compressed with a movement of the front wheel 11 to obtain a cushioning effect. The turning about the steering axis C1 with an operation of the bar handle 18 and the steering of the front wheel 11 are linked to each other via the handle post 35, the link members 40, the steering member 45, the supporting member 15, and the front fork 17.

The steering axis C1 is the center of turning of the handle post 35 which is turned with an operation of the bar handle 18, and coincides with the center axis of a cylindrical boss portion 32 in the handle supporting portion 31. The steered axis C2 (turning axis) is the center of turning of the front fork 17 which is turned with an operation of the bar handle 18, and coincides with the center axis of the cylindrical supporting member 15. An angle of the steered axis C2 with respect to the vertical direction is the "caster angle." The steered axis C2 is offset (spaced away) from the steering axis C1 toward the front side in the side view. The steered axis C2 and the steering axis C1 are substantially parallel to each other.

<Front Fork>

The front fork 17 integrally includes a shaft portion 16 forming the steered axis C2, a pair of left and right arm portions 17a extending in the up-down directions, and a cross member 17b connecting upper end portions of the left and right arm portions 17a to each other. The left and right arm portions 17a are arranged respectively on left and right sides of the front wheel 11. The cross member 17b curves inward in the vehicle width directions along a tread surface of the front wheel 11 at an upper end thereof, and is arranged between the upper end portions of the left and right arm portions 17a. Left and right end portions of the cross member 17b are joined to the upper end portions of the left and right arm portions 17a. The elements of the front fork 17 are made of, for example, integral aluminum parts and are welded into one part.

The shaft portion 16 of the front fork 17 is supported by the cylindrical supporting member 15, inside the supporting member 15 in a radial direction thereof, to be turnable about the steered axis C2. An upper end portion 16a of the shaft portion 16 of the front fork 17 is connected to the steering member 45.

A shaft supporting portion 17c to which a lower end portion 16b of the shaft portion 16 is connected is formed in an upper end portion of the cross member 17b. An insertion hole 17h opened in a direction in which the shaft portion 16 extends is formed in the shaft supporting portion 17c of the cross member 17b. The shaft portion 16 is inserted into the insertion hole 17h from the upper end portion 16a, and the lower end portion 16b of the shaft portion 16 and the shaft supporting portion 17c are welded together with the lower end portion 16b of the shaft portion 16 located in the insertion hole 17h. The upper end portion of the cross member 17b is thereby fixed to the lower end portion 16b of the shaft portion 16.

Referring also to FIG. 2, an axle of the front wheel 11 (hereafter, referred to as "front axle") is connected to lower end portions 17d of the left and right arm portions 17a. For example, both end portions of the front axle in the vehicle width directions are fixed to the lower end portions 17d of the left and right arm portions 17a via not-illustrated ball bearings, respectively. A wheel of the front wheel 11 is supported by a center portion of the front axle in the vehicle width directions to be rotatable. A front fender 12 (see FIG. 1) is supported on the cross member 17b via not-illustrated bolts. The illustration of the front fender 12 and the like are omitted in FIGS. 2 and 4 for convenience.

Note that reference sign 13 in FIG. 1 denotes a brake caliper. Reference sign 13a denotes a brake rotor. Reference sign C10 denotes the center axis of the front axle. Reference sign C10L denotes a vertical line extending from the center axis C10 to a road surface R. Reference sign T denotes a trail.

<Handle Supporting Portion>

The handle supporting portion 31 is provided in the upper front end portions of the front blocks 3 to be inclined rearward relative to the vertical direction in the side view. The handle supporting portion 31 is provided integrally with upper end portions of the front blocks 3 made of, for example, aluminum. The handle supporting portion 31 supports the handle post 35 such that the handle post 35 is turnable (steerable).

Specifically, the handle supporting portion 31 is formed of: the cylindrical boss portion 32 which forms the steering axis C1; and left and right extending portions 33L, 33R which extend upward and rearward from the upper front end portions of the front blocks 3 as inclining inward in the vehicle width directions to be connected to a lower end portion 32b (lower portion) of the boss portion 32. A bolt 34a (see FIG. 5) extending in the vehicle width directions and serving as a connection shaft connecting the left and right extending portions 33L, 33R to each other is provided in the left and right extending portions 33L, 33R. Cushion upper connection portions 27c (see FIG. 5) to which an upper end portion 27a of the cushion member 27 is connected are formed in the left and right extending portions 33L, 33R. The handle post 35 is provided in an upper end portion 32a (upper portion) of the boss portion 32 to be turnable about the steering axis C1.

<Handle Post>

Figure 3:
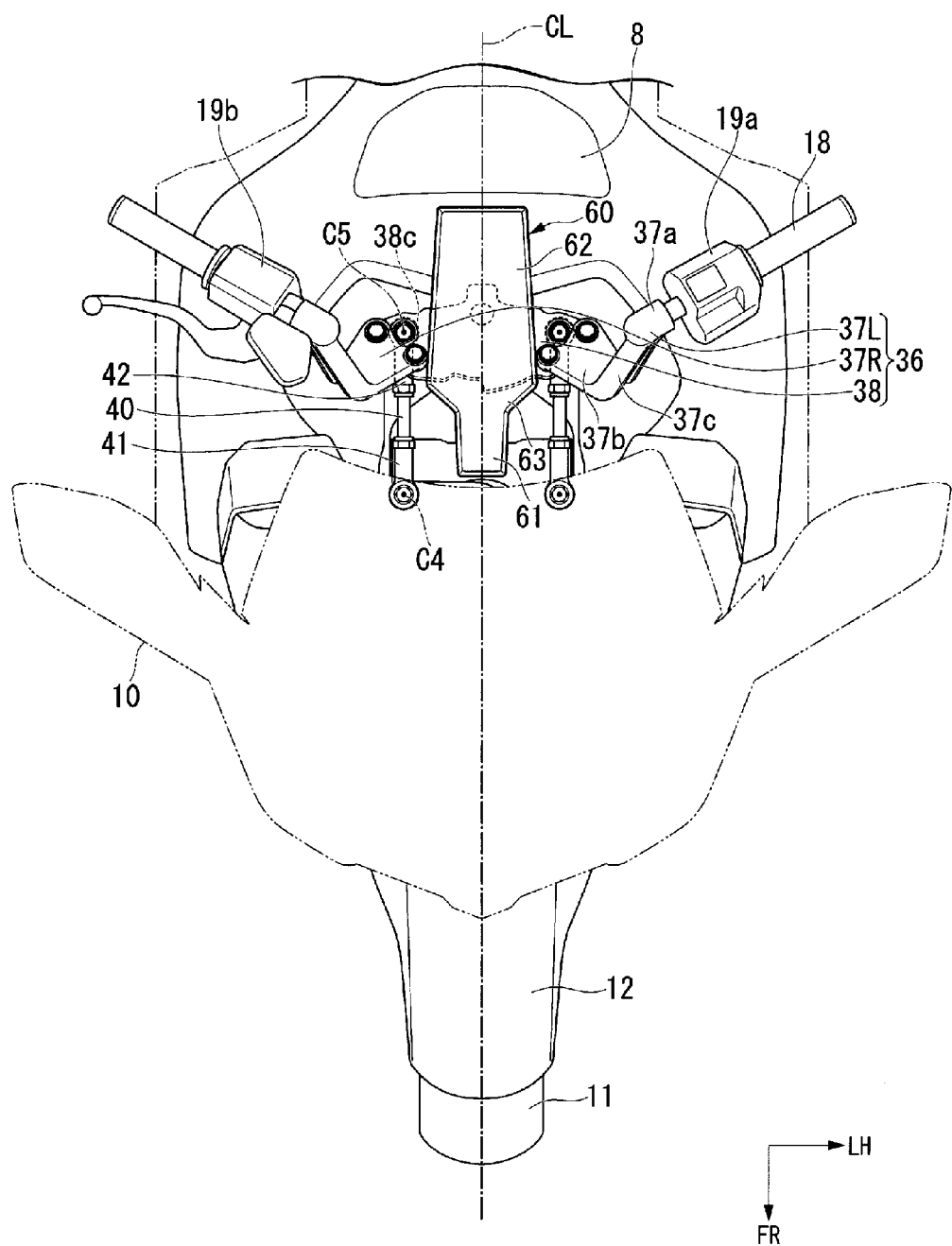
FIG. 3 is a top view of the vehicle front portion of the aforementioned motorcycle.

The handle post 35 is formed of: a holder 36 to which the bar handle 18 is fixed; and a cylindrical shaft portion 39 which is connected to a lower portion of the holder 36 and whose center axis coincides with the steering axis C1. Referring also to FIG. 3, the holder 36 is formed in a W-shape in a top view. The holder 36 has: a base portion 38 whose thickness direction is parallel to the steering axis C1 and which is formed in such a fan shape that its width in the left-right directions increases toward the front side; and left and right extending portions 37L, 37R which are connected to left and right end portions of the base portion 38 and which extend rearward and upward to be formed in an L-shape in the side view.

The shaft portion 39 is supported by the boss portion 32, inside the boss portion 32 in a radial direction thereof, to be turnable about the steering axis C1. A rear portion 38b of the base portion 38 is welded to an upper end portion of the shaft portion 39. Link rear connection portions 38c to which rear end portions of the pair of left and right link members 40 are connected are formed in bottom surfaces of left and right portions of the base portion 38.

Each of the left and right extending portions 37L, 37R integrally includes: a handle connection portion 37a to which an end portion of the bar handle 18 on the inner side in the vehicle width directions is connected; a first extending portion 37b which is connected to a corresponding one of left and right end portions 38a of the base portion 38 and which extends forward and upward in the side view along the inclination of the base portion 38; and a second extending portion 37c which extends rearward and upward from an upper front end of the first extending portion 37b to be connected to the handle connection portion 37a.

The bar handle 18 and the left and right extending portions 37L, 37R are, for example, aluminum parts and are welded together into one part. For example, the bar handle 18 includes left and right separated handles which are separated into two parts in the vehicle width directions, and portions of the left and right separated handles on the inner sides in the vehicle width directions are welded to the handle connection portions 37a of the left and right extending portions 37L, 37R. Note that the bar handle 18 and the left and right extending portions 37L, 37R may be integrated in such a way that insertion holes extending in the vehicle width directions are formed in the handle connection portions 37a and the portions of the left and right separated handles on the inner sides in the vehicle width directions are press fitted into the insertion holes.

The second extending portions 37c of the left and right extending portions 37L, 37R are fastened and fixed to the left and right end portions 38a of the base portion 38 by multiple (for example, two on each of left and right sides in the embodiment) fastening members (bolts). Note that the second extending portions 37c of the left and right extending portions 37L, 37R may be welded to the left and right end portions 38a of the base portion 38.

The shaft portion 39 of the handle post 35 being turnably supported by the boss portion 32 enables the handle post 35 to be turned (steered) about the steering axis C1 with an operation of the bar handle 18.

Note that reference sign 19a in FIG. 3 denotes a switch box including switches such as a dimmer switch and a turn signal switch. Reference sign 19b denotes a master cylinder connected to a brake lever. Illustration of a clutch lever is omitted. Furthermore, the motorcycle may employ an automatic clutch.

<Cover Member>

A cover member 60 covering a portion above the handle post 35 in the top view is provided above the handle post 35. The cover member 60 is made of, for example, synthetic resin and integrally includes: a first cover portion 61 formed in a rectangular shape extending in the front-rear directions in the top view; a second cover portion 62 provided behind the first cover portion 61 and formed in a rectangular shape extending in the front-rear directions in the top view; and a connection portion 63 connecting a rear portion of the first cover portion 61 and a front portion of the second cover portion 62 to each other.

Specifically, the first cover portion 61 extends in the front-rear directions in the top view (to be more specific, extends along the center line CL in the vehicle left-right directions such that the width of the first cover portion 61 in the left-right directions gradually increases toward the rear side in the top view) to reach the connection portion 63. The second cover portion 62 extends in the front-rear directions in the top view (to be more specific, extends along the center line CL in the vehicle left-right directions such that the width of the second cover portion 62 gradually increases toward the front side) to reach the connection portion 63. The second cover portion 62 is located inside the left and right extending portions 37L, 37R in the vehicle width directions in the top view and covers the portion above the base portion 38. The connection portion 63 is formed in a trapezoid shape whose width in the left-right directions increases toward the rear side in the top view, and connects the rear end of the first cover portion 61 and the front end of the second cover portion 62.

<Supporting Member>

Referring also to FIGS. 1 and 4, the supporting member 15 is provided in front of and away from the steering axis C1. Specifically, the supporting member 15 is formed in a cylindrical shape and is provided in front of the front blocks 3 to be inclined rearward with respect to the vertical direction. The inside of the supporting member 15 in the radial direction supports the shaft portion 16 of the front fork 17 such that the shaft portion 16 is turnable (steerable) about the steered axis C2. The upper end portion 16a of the shaft portion 16 protrudes upward beyond an upper end portion 15a of the supporting member 15. Note that the center axes of the shaft portion 16 and the supporting member 15 coincide with the steered axis C2.

An upper connection portion 15c to which front end portions 21a of the upper arm 21 are connected is formed in an upper front portion of the supporting member 15 to protrude forward and upward. Lower connection portions 15d to which front end portions 22a of the lower arm 22 are connected are formed in a lower rear portion of the supporting member 15 to protrude rearward and downward. The upper connection portion 15c is arranged in front of the steered axis C2 in the side view, while the lower connection portions 15d are arranged behind the steered axis C2 in the side view. Ribs 15r for reinforcing the lower connection portions 15d are formed on left and right surfaces of the supporting member 15. The ribs 15r are each formed in a V-shape open upward and to the front in the side view, and branch from the lower connection portions 15d to extend forward and upward such that the height of the ribs increases toward the lower connection portions 15d.

<Steering Member>

The steering member 45 is supported by the upper end portion 16a of the shaft portion 16, above the upper end portion 15a of the supporting member 15. Referring to FIGS. 1 to 4, the steering member 45 integrally includes: link front connection portions 45a to which front end portions of the link members 40 are connected; a shaft supporting portion 45b which is formed in a C-shape open to the front as viewed in the direction of the steered axis C2; and connection portions 45c which extend upward from an upper end of the shaft supporting portion 45b as inclining outward in the vehicle width directions and which connect the link front connection portions 45a and the shaft supporting portion 45b to each other. The link front connection portions 45a, the shaft supporting portion 45b, and the connection portions 45c are, for example, aluminum parts and are formed integrally.

Referring to FIGS. 1 to 4, in the embodiment, the connection portions 45c extend upward from left and right upper ends of the shaft supporting portion 45b as inclining outward in the vehicle width directions, and reach the link front connection portions 45a. In FIG. 4, illustration of the left link member 40 is omitted for convenience.

An insertion hole opened in the vehicle width directions is formed in a front end portion of the shaft supporting portion 45b. For example, the steering member 45 is fastened and fixed to the upper end portion 16a of the shaft portion 16 by screwing and fastening a bolt to a nut through the insertion hole with the upper end portion 16a of the shaft portion 16 inserted into the shaft supporting portion 45b. The steering member 45 can be turned (steered) about the steered axis C2 together with the front fork 17 with an operation of the bar handle 18.

<Link Member>

The link members 40 have linear shapes extending in the front-rear directions in the side view and the top view. The link members 40 are provided on the left and right sides in the vehicle width directions. Front ball joints 41 connected to the link front connection portions 45a are provided in the front end portions of the link members 40. Rear ball joints 42 connected to the link rear connection portions 38c are provided in the rear end portions of the link members 40.

The front and rear ball joints 41, 42 each include a ball stud 43 and a socket 44. The ball stud 43 includes a spherical ball portion 43a and a stud portion 43b protruding above the ball portion 43a. The ball portion 43a is slidably held inside the socket 44. The stud portion 43b extends linearly in the vehicle up-down directions. The socket 44 includes upper and lower sockets 44a, 44b. The ball portion 43a is slidably held between the upper and lower sockets 44a, 44b.

Insertion holes opened in the vehicle up-down directions are formed in the link front connection portions 45a. The stud portions 43b of the front ball joints 41 are fastened and fixed to the link front connection portions 45a by inserting screw portions, provided in upper end portions of the stud portions 43b of the front ball joints 41, into the insertion holes of the link front connection portions 45a and screwing and fasting nuts to the screw portions protruding above the link front connection portions 45a. Hereafter, the center axes of the stud portions 43b in the front ball joints 41 are referred to as "first axes C4." The front end portions of the link members 40 are connected to the link front connection portions 45a via the front ball joints 41 to be turnable about the first axes C4.

Insertion holes opened in the vehicle up-down directions are formed in the link rear connection portions 38c. The stud portions 43b of the rear ball joints 42 are fastened and fixed to the link rear connection portions 38c by inserting screw portions, provided in upper end portions of the stud portions 43b of the rear ball joints 42, into the insertion holes of the link rear connection portions 38c and screwing and fasting nuts to the screw portions protruding above the link rear connection portions 38c. Hereafter, the center axes of the stud portions 43b in the rear ball joints 42 are referred to as "second axes C5." The rear end portions of the link members 40 are connected to the link rear connection portions 38c via the rear ball joints 42 to be turnable about the second axes C5.

For example, each of the link members 40 has screw portions in the front and rear end portions and is fixed by using lock nuts such that the front and rear screw portions are screwed at predetermined screwing amounts respectively to a rear end portion of the lower socket 44b of the front ball joint 41 and a front end portion of the lower socket 44b of the rear ball joint 42. This enables adjustment of the distance between front and rear connection portions of the link member 40 by fastening or loosening the lock nuts to increase or decrease the screwing amounts of the lower sockets 44b and the screw portions.

<Supporting Arm>

The supporting arm 20 includes the upper and lower arms 21, 22 extending in the vehicle front-rear directions and provided to be swingable in the up-down directions. The upper and lower arms 21, 22 are arranged one on top of another in the vehicle up-down directions to extend in the vehicle front-rear directions. The front end portions 21a of the upper arm 21 are arranged outside the upper portion of the supporting member 15 in the vehicle width directions, and the front end portions 22a of the lower arm 22 are arranged inside the lower portions of the supporting member 15 in the vehicle width directions. The rear end portions 21b, 22b of the upper and lower arms 21, 22 are arranged inside front portions of the front blocks 3 in the vehicle width directions. The rear end portions 21b, 22b of the upper and lower arms 21, 22 are housed inside the gate-shaped lower open portion 3s in the front blocks 3.

In the side view, the front and rear end portions 21a, 21b of the upper arm 21 are arranged in front of the front and rear end portions 22a, 22b of the lower arm 22, respectively. In the side view, the front end portions 21a of the upper arm 21 are located in front of the steered axis C2, and the front end portions 22a of the lower arm 22 is located behind the steered axis C2. The rear end portions 21b, 22b of the upper and lower arms 21, 22 are swingably supported by the front portions of the front blocks 3. The supporting member 15 is swingably connected to the front end portions 21a, 22a of the upper and lower arms 21, 22.

Figure 5:
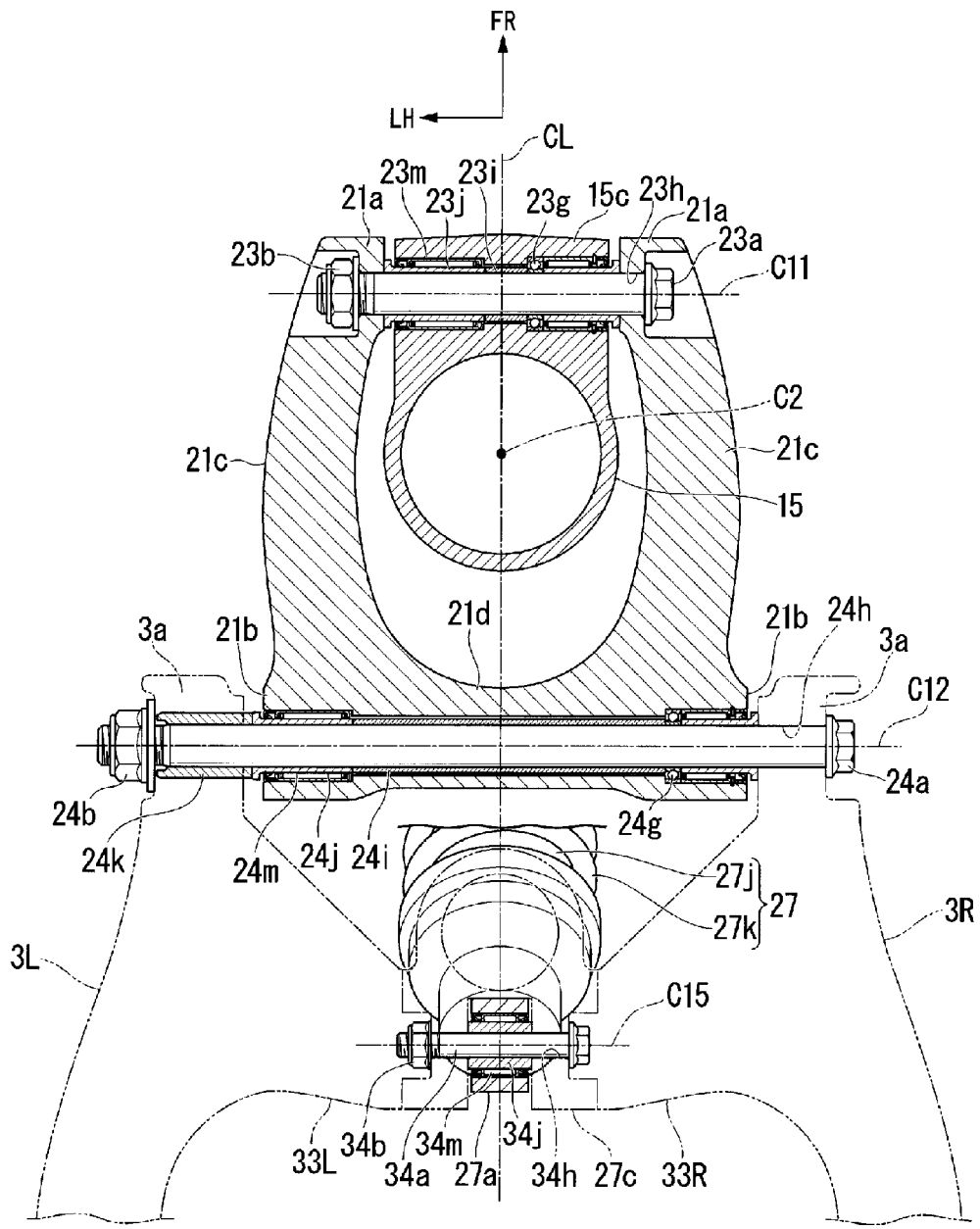
FIG. 5 is a cross-sectional view including a cross section along a first connection axis of an upper arm of the aforementioned front wheel suspension device, a cross section along a second connection axis of the upper arm, and a cross section along the center axis of a connection portion for an upper end portion of a cushion member.
Figure 6:
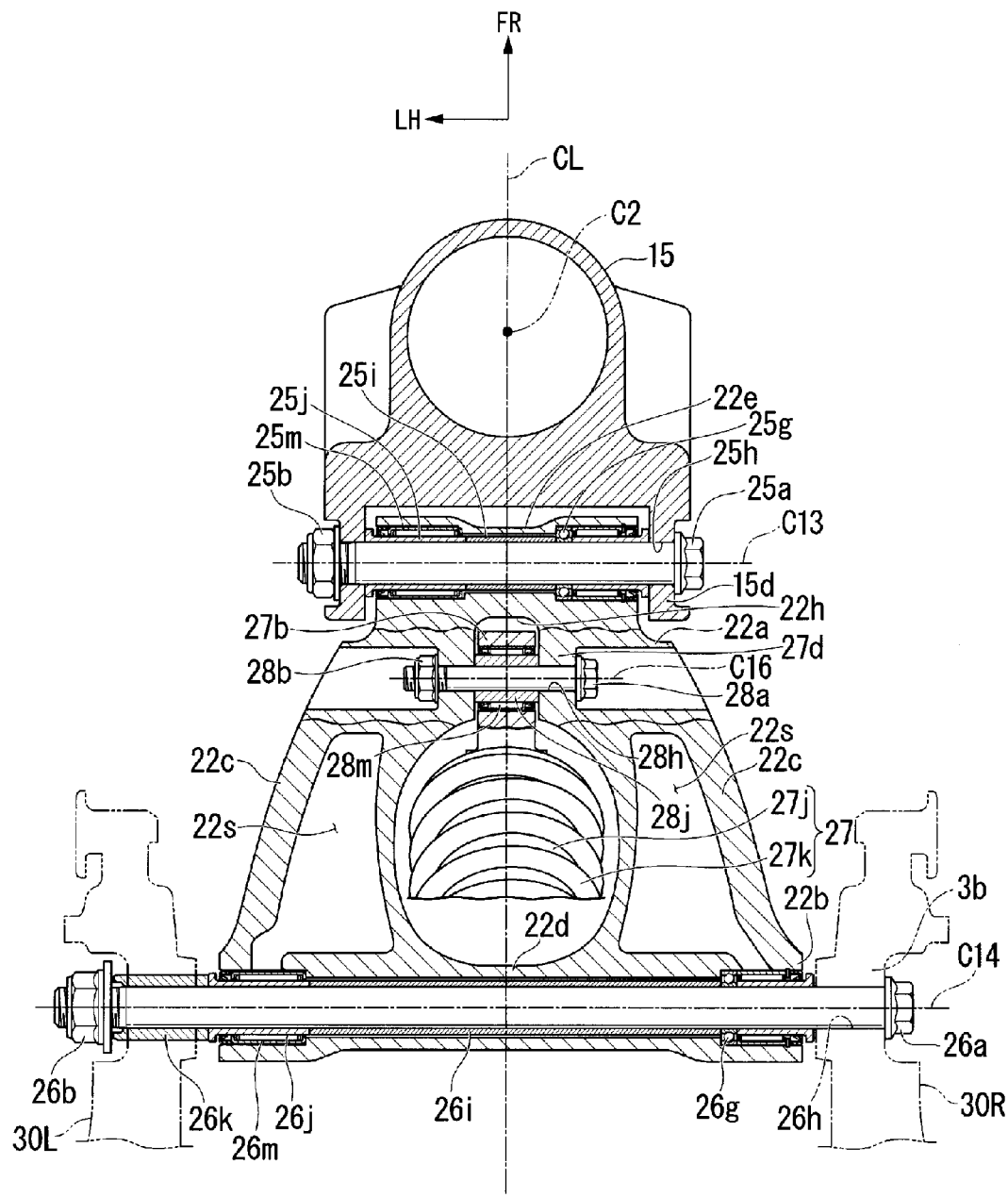
FIG. 6 is a cross-sectional view including a cross section along a third connection axis of a lower arm of the aforementioned front wheel suspension device, a cross section along a fourth connection axis of the lower arm, and a cross section along the center axis of a connection portion for a lower end portion of the cushion member.

Referring also to FIGS. 5 and 6, the upper and lower connection portions 15c, 15d of the supporting member 15 are swingably connected to the front end portions 21a, 22a of the upper and lower arms 21, 22 via bolts 23a, 25a serving as connection shafts extending in the vehicle width directions. The bolt 23a penetrates the upper connection portion 15c of the supporting member 15 and the front end portions 21a of the upper arm 21 and extends in the vehicle width directions. The bolt 25a penetrates the lower connection portions 15d of the supporting member 15 and the front end portions 22a of the lower arm 22 and extends in the vehicle width directions. Reference sign C11 in the drawings denotes the center axis of the bolt 23a connecting the upper connection portion 15c of the supporting member 15 and the front end portions 21a of the upper arm 21 to each other. Reference sign C13 in the drawings denotes the center axis of the bolt 25a connecting the lower connection portions 15d of the supporting member 15 and the front end portions 22a of the lower arm 22 to each other.

The rear end portions 21b, 22b of the upper and lower arms 21, 22 are swingably connected to the upper and lower connection portions 3a, 3b of the front blocks 3 via bolts 24a, 26a serving as connection shafts extending in the vehicle width directions. The bolt 24a penetrates the rear end portions 21b of the upper arm 21 and the upper connection portions 3a of the front blocks 3 and extends in the vehicle width directions. The bolt 26a penetrates the rear end portions 22b of the lower arm 22 and the lower connection portions 3b of the left and right extending portions 30L, 30R and extends in the vehicle width directions. The rear end portions 21b, 22b of the upper and lower arms 21, 22 being turnably supported via the bolts 24a, 26a penetrating the front blocks 3 and extending in the vehicle width directions enables the upper and lower arms 21, 22 to be supported with high stiffness. Reference sign C12 in the drawings denotes the center axis of the bolt 24a connecting the rear end portions 21b of the upper arm 21 and the upper connection portions 3a of the front blocks 3 to each other. Reference sign C14 in the drawings denotes the center axis of the bolt 26a connecting the rear end portions 22b of the lower arm 22 and the lower connection portions 3b of the left and right extending portions 30L, 30R to each other.

Hereafter, the center axis of the bolt 23a is referred to as "first connection axis C11," the center axis of the bolt 24a as "second connection axis C12," the center axis of the bolt 25a as "third connection axis C13," and the center axis of the bolt 26a as "fourth connection axis C14."

Referring also to FIG. 1, a straight line passing through the first connection axis C11 and the second connection axis C12 in the side view is referred to as "first straight line AX1," and a straight line passing through the third connection axis C13 and the fourth connection axis C14 in the side view is referred to as "second straight line AX2." The first straight line AX1 of the upper arm 21 and the second straight line AX2 of the lower arm 22 are substantially parallel in the side view.

In the side view, the length of the upper arm 21 in the front-rear directions is substantially the same as the length of the lower arm 22 in the front-rear directions. In other words, the length of a segment connecting the first connection axis C11 and the second connection axis C12 and the length of a segment connecting the third connection axis C13 and the fourth connection axis C14 are substantially the same in the side view. Due to this configuration, the supporting member 15 moves in the up-down directions substantially parallel to the swinging of the upper and lower arms 21, 22 in the up-down directions. Note that the upper and lower arms 21, 22 may be installed such that the supporting member 15 moves while inclining with respect to the swinging of the upper and lower arms 21, 22 in the up-down directions.

The rear end portions 21b (second connection axis C12) of the upper arm 21 and the rear end portions 22b (fourth connection axis C14) of the lower arm 22 are arranged between the steered axis C2 and a stroke axis C3 to be described later in the side view.

<Upper Arm>

Referring also to FIG. 5, the upper arm 21 integrally includes a pair of left and right arm main bodies 21c extending in the front-rear directions and a cross member 21d connecting the rear end portions 21b of the left and right arm main bodies 21c to each other. The elements of the upper arm 21 are, for example, aluminum parts and are formed integrally.

The left and right arm main bodies 21c are arranged on left and right sides of the upper portion of the supporting member 15. The left and right arm main bodies 21c curve inward in the vehicle width directions, along an outer wall surface of the upper portion of the supporting member 15.

The cross member 21d extends in the vehicle width directions behind the upper portion of the supporting member 15. Both end portions of the cross member 21d are joined to the rear end portions 21b of the left and right arm main bodies 21c, respectively.

Insertion holes 23h opened in the vehicle width directions are formed in the front end portions 21a of the left and right arm main bodies 21c. The bolt 23a is screwed and fastened to a nut 23b while passing through the insertion holes 23h and an inner peripheral portion of the upper connection portion 15c of the supporting member 15, with the upper connection portion 15c interposed between the front end portions 21a of the left and right arm main bodies 21c. A pair of left and right side collars 23j for supporting a pair of left and right needle bearings 23m, a center collar 23i for securing the distance between the left and right side collars 23j, and a ball bearing 23g configured to receive thrust via the right side collar 23j and the center collar 23i are provided on an outer periphery of the bolt 23a. The upper connection portion 15c of the supporting member 15 is supported by the front end portions 21a of the upper arm 21 via the left and right side collars 23*j*, the center collar 23*i*, and the ball bearing 23*g* to be turnable about the first connection axis C11.

Insertion holes 24*h* opened in the vehicle width directions are formed in the upper connection portions 3*a* of the left and right front blocks 3L, 3R. An adjustment collar 24*k* for adjusting left and right gaps are provided in the upper connection portion 3*a* of the left front block 3L. The bolt 24*a* is screwed and fastened to a nut 24*b* while passing through the insertion holes 24*h* and inner peripheral portions of the rear end portions 21*b* (rear end portions 21*b* of the left and right arm main bodies 21*c* and the cross member 21*d*) of the upper arm 21, with the rear end portions 21*b* of the upper arm 21 interposed between the upper connection portions 3*a* of the left and right front blocks 3L, 3R. A pair of left and right side collars 24*j* for supporting a pair of left and right needle bearings 24*m*, a center collar 24*i* for securing the distance between the left and right side collars 24*j*, and a ball bearing 24*g* configured to receive thrust via the right side collar 24*j* and the center collar 24*i* are provided on an outer periphery of the bolt 24*a*. The rear end portions 21*b* of the upper arm 21 are supported by the upper connection portions 3*a* of the left and right front blocks 3L, 3R via the left and right side collars 24*j*, the center collar 24*i*, and the ball bearing 24*g* to be turnable about the second connection axis C12.

<Lower Arm>

Referring also to FIG. 6, the lower arm 22 integrally includes a pair of left and right arm main bodies 22*c* extending in the front-rear directions, a front cross member 22*e* connecting the front end portions 22*a* of the left and right arm main bodies 22*c* to each other, and a rear cross member 22*d* connecting the rear end portions 22*b* of the left and right arm main bodies 22*c* to each other. The elements of the lower arm 22 are, for example, aluminum parts and are formed integrally.

The left and right arm main bodies 22*c* are arranged on left and right sides of a lower portion of the cushion member 27. The left and right arm main bodies 22*c* curve inward in the vehicle width directions, along an outer peripheral surface of the lower portion of the cushion member 27 (spring 27*k* to be described later). Spaces 22*s* curved inward in the vehicle width directions are formed inside the left and right arm main bodies 22*c*.

The front cross member 22*e* extends in the vehicle width directions in front of the lower portion of the cushion member 27. Both end portions of the front cross member 22*e* are joined to the front end portions 22*a* of the left and right arm main bodies 22*c*, respectively.

The rear cross member 22*d* extends in the vehicle width directions behind the lower portion of the cushion member 27. Both end portions of the rear cross member 22*d* are joined to the rear end portions 22*b* of the left and right arm main bodies 22*c*, respectively.

Insertion holes 25*h* opened in the vehicle width directions are formed in the left and right lower connection portions 15*d* which protrude rearward from a rear left portion and a rear right portion of the supporting member 15. The bolt 25*a* is screwed and fastened to a nut 25*b* while passing through the insertion holes 25*h* and inner peripheral portions of the front end portions 22*a* of the left and right arm main bodies 22*c* (front end portions 22*a* of the left and right arm main bodies 22*c* and the front cross member 22*e*), with the front end portions 22*a* of the left and right arm main bodies 22*c* interposed between the left and right lower connection portions 15*d*. A pair of left and right side collars 25*j* for supporting a pair of left and right needle bearings 25*m*, a center collar 25*i* for securing the distance between the left and right side collars 25*j*, and a ball bearing 25*g* configured to receive thrust via the right side collar 25*j* and the center collar 25*i* are provided on an outer periphery of the bolt 25*a*. The left and right lower connection portions 15*d* of the supporting member 15 are supported by the front end portions 22*a* of the lower arm 22 via the left and right side collars 25*j*, the center collar 25*i*, and the ball bearing 25*g* to be turnable about the third connection axis C13.

Insertion holes 26*h* opened in the vehicle width directions are formed in the lower connection portions 3*b* of the left and right extending portions 30L, 30R. An adjustment collar 26*k* for adjusting left and right gaps are provided in the lower connection portion 3*b* of the left extending portion 30L. The bolt 26*a* is screwed and fastened to a nut 26*b* while passing through the insertion holes 26*h* and inner peripheral portions of the rear end portions 22*b* (rear end portions 22*b* of the left and right arm main body 22*c* and the rear cross member 22*d*) of the lower arm 22, with the rear end portions 22*b* of the lower arm 22 interposed between the lower connection portions 3*b* of the left and right extending portions 30L, 30R. A pair of left and right side collars 26*j* for supporting a pair of left and right needle bearings 26*m*, a center collar 26*i* for securing the distance between the left and right side collars 26*j*, and a ball bearing 26*g* configured to receive thrust via the right side collar 26*j* and the center collar 26*i* are provided on an outer periphery of the bolt 26*a*. The rear end portions 22*b* of the lower arm 22 are supported by the lower connection portions 3*b* of the left and right extending portions 30L, 30R via the left and right side collars 26*j*, the center collar 26*i*, and the ball bearing 26*g* to be turnable about the fourth connection axis C14.

In the lower arm 22, a recess portion 22*h* open upward and rearward is formed in the front end portions 22*a* of the left and right arm main bodies 22*c*, behind a center portion of the front cross member 22*e* in the vehicle width directions. A lower end portion 27*b* of the cushion member 27 is housed in the recess portion 22*h*. Moreover, cushion lower connection portions 27*d* to which the lower end portion 27*b* of the cushion member 27 is connected are formed in portions of the front end portions 22*a* of the left and right arm main bodies 22*c* which face the recess portion 22*h*.

<Cushion Member>

Referring also to FIG. 1, the cushion member 27 includes a rod damper 27*j* inclining rearward as extending upward in the side view and the coil spring 27*k* wound around the damper 27*j*. The cushion member 27 is expanded and compressed in its stroke along the center axis C3 and thereby provides a predetermined cushioning effect. Hereafter, the center axis C3 is referred to as "stroke axis." The cushion upper connection portions 27*c* are arranged behind the steering axis C1 such that that the stroke axis C3 is inclined rearward with respect to the vertical direction in the side view.

The cushion member 27 provides the cushioning effect by causing the lower end portion 27*b* to move in its stroke with swinging of the lower arm 22. The cushion member 27 is arranged in front of and above the engine and behind and above the front wheel 11 in the side view. An upper portion of the cushion member 27 is housed in the lower open portion 3*s* in the gate shape of the front blocks 3. The upper end portion 27*a* of the cushion member 27 is covered with the front blocks 3 in the side view. The upper end portion 27*a* of the cushion member 27 is swingably connected to the cushion upper connection portions 27*c* (see FIG. 5) of the left and right extending portions 33L, 33R, and the lower end portion 27b of the cushion member 27 is swingably connected to the cushion lower connection portions 27d (see FIG. 6) of the lower arm 22.

Referring to FIG. 5, the upper end portion 27a of the cushion member 27 is swingably connected to the cushion upper connection portions 27c of the left and right extending portions 33L, 33R via the bolt 34a serving as the connection shaft extending in the vehicle width directions. The bolt 34a penetrates the cushion upper connection portions 27c and the upper end portion 27a of the cushion member 27 and extends in the vehicle width directions. Reference sign C15 denotes the center axis of the bolt 34a connecting the cushion upper connection portions 27c and the upper end portion 27a of the cushion member 27 to each other.

Insertion holes 34h opened in the vehicle width directions are formed in the cushion upper connection portions 27c of the left and right extending portions 33L, 33R. The bolt 34a is inserted through the insertion holes 34h and an inner peripheral portion of the upper end portion 27a of the cushion member 27 with the upper end portion 27a of the cushion member 27 interposed between the cushion upper connection portions 27c of the left and right extending portions 33L, 33R, and a nut 34b is screwed and fastened to a protruding portion of the bolt 34a. A collar 34j for supporting a needle bearing 34m is provided on an outer periphery of the bolt 34a. The upper end portion 27a of the cushion member 27 is supported by the cushion upper connection portions 27c of the left and right extending portions 33L, 33R via the collar 34j to be turnable about the center axis C15.

Referring to FIG. 6, the lower end portion 27b of the cushion member 27 is swingably connected to the left and right cushion lower connection portions 27d of the lower arm 22 via a bolt 28a serving as a connection shaft extending in the vehicle width directions. The bolt 28a penetrates the cushion lower connection portions 27d and the lower end portion 27b of the cushion member 27 and extends in the vehicle width directions. Reference sign C16 denotes the center axis of the bolt 28a connecting the cushion lower connection portions 27d and the lower end portion 27b of the cushion member 27 to each other.

Insertion holes 28h opened in the vehicle width directions are formed in the left and right cushion lower connection portions 27d of the lower arm 22. The bolt 28a is inserted through the insertion holes 28h and an inner peripheral portion of the lower end portion 27b of the cushion member 27 with the lower end portion 27b of the cushion member 27 interposed between the left and right cushion lower connection portions 27d of the lower arm 22, and a nut 28b is screwed and fastened to a protruding portion of the bolt 28a. A collar 28j for supporting a needle bearing 28m is provided on an outer periphery of the bolt 28a. The lower end portion 27b of the cushion member 27 is supported by the left and right cushion lower connection portions 27d of the lower arm 22 via the collar 28j to be turnable about the center axis C16.

Operations of the cushion member 27 are described below.

When front wheel braking or the like causes the front wheel 11 to be relatively displaced upward from a position thereof at a one-G state where load corresponding the weight of the vehicle is applied to the front wheel suspension device 1, the supporting arm 20 swings upward, and the front fork 17 and the supporting member 15 are displaced upward. At this time, the lower arm 22 turns in a right-handed direction (clockwise) in FIG. 1 about the fourth connection axis C14.

Then, the lower arm 22 displaces the lower end portion 27b of the cushion member 27 upward and compress the cushion member 27.

When the supporting member 15 is displaced upward, the steering member 45 is also displaced together with the displacement of the supporting member 15. At this time, the link members 40 are displaced relative to the handle post 35, and the angle of the steered axis C2 relative to the steering axis C1 changes. However, this change is absorbed by the swinging of the front and rear ball joints 41, 42 and the swinging of the link members 40.

Meanwhile, when acceleration or the like causes the front wheel 11 to be relatively displaced downward from the position thereof at the one-G state, the supporting arm 20 swings downward, and the front fork 17 and the supporting member 15 are displaced downward. At this time, the lower arm 22 turns in a left-handed direction (counterclockwise) in FIG. 1 about the fourth connection axis C14. Then, the lower arm 22 displaces the lower end portion 27b of the cushion member 27 downward and expand the cushion member 27.

When the supporting member 15 is displaced downward, the steering member 45 is also displaced together with the displacement of the supporting member 15. At this time, the link members 40 are displaced relative to the handle post 35, and the angle of the steered axis C2 relative to the steering axis C1 changes. However, this change is absorbed by the swinging of the front and rear ball joints 41, 42 and the swinging of the link members 40.

As described above, in the aforementioned embodiment, the front wheel supporting frame structure of the motorcycle including: the main frames 2 which extend in the vehicle front-rear directions; and the upper and lower arms 21, 22 which extend in the vehicle front-rear directions and by which the front wheel 11 is supported to be swingable in the up-down directions further includes the lower frames 6 extending forward in the vehicle lower portion from the rear portions of the main frames 2 and then extending upward in the vehicle front portion. In the front wheel supporting frame structure, the upper connection portions 3a to which the rear end portions 21b of the upper arm 21 are swingably connected are formed in the upper front portions of the main frames 2, the extending portions 30 extending downward are formed in the lower front portions of the main frames 2, the lower connection portions 3b to which the rear end portions 22b of the lower arm 22 are swingably connected are formed in the extending portions 30, and the upper front portions 6a of the lower frames 6 are connected to the extending portions 30.

In this configuration, the extending portions 30 extending downward are formed in the lower front portions of the main frames 2, and the upper front portions 6a of the lower frames 6, extending forward in the vehicle lower portion from the rear portions of the main frames 2 and then extending upward in the vehicle front portion, are connected to the extending portions 30. This can achieve reinforcement of the extending portions 30 which are overhangs of the main frames 2, with the lower frames 6, thereby improving the stiffness of the frame. Moreover, the lower connection portions 3b to which the rear end portions 22b of the lower arm 22 are swingably connected are formed in the extending portions 30. This can increase an interval between the upper and lower arms 21, 22 in the up-down directions and thereby reduce the load of the upper and lower arms 21, 22, compared to the case where no extending portions 30 are formed. Furthermore, reinforcing the extending portions 30 with the lower frames 6 which are constitutional elements of the vehicle body frame can reduce the weight of the front wheel supporting frame structure compared to the case where additional reinforcement members are provided.

Moreover, in the aforementioned embodiment, the upper front portions 6a of the lower frames 6 are joined to the front portions 30f of the extending portions 30. This can achieve reinforcement of the front portions 30f of the extending portions 30 with the lower frames 6. Accordingly, it is possible to effectively reduce load from the front side of the vehicle generated by swinging of the lower arm 22 and also further improve the stiffness of the lower connection portions 3b.

Furthermore, in the aforementioned embodiment, the joining portions 30c to which the upper front portions 6a of the lower frames 6 are joined are formed in the front portions 30f of the extending portions 30, and the upper front portions 6a of the lower frames 6 are joined to the joining portions 30c by using the bolts 30j (fasteners) configured to fasten the upper front portions 6a from the front side of the vehicle. This enables fastening of the bolts 30j from the front side of the vehicle with rear surfaces of the upper front portions 6a of the lower frames 6 brought into tight contact with front surfaces of the extending portions 30. Accordingly, the fastening strength between the front portions 30f of the extending portions 30 and the upper front portions 6a of the lower frames 6 can be improved. Moreover, fastening of the upper front portions 6a of the lower frames 6 to the front portions 30f of the extending portions 30 is facilitated compared to the case where fasteners configured to fasten the upper front portions 6a from the rear side of the vehicle are provided.

Moreover, in the aforementioned embodiment, the multiple bolts 30j are provided to be offset from one another in the up-down directions and the left-right directions in the front view. This can secure arrangement intervals among the bolts 30j in the up-down directions and the left-right directions. Accordingly, it is possible to increase the surface area where the front surface of each extending portion 30 and the rear surface of the upper front portion 6a of the corresponding lower frame 6 come into tight contact with each other, and improve the fastening strength between the front portions 30f of the extending portions 30 and the upper front portions 6a of the lower frames 6, compared to the case where the bolts 30j are offset in either the up-down directions or the left-right directions.

Furthermore, in the aforementioned embodiment, the extending portions 30 incline toward the center in the vehicle width directions as extending upward in the front view. This can prevent sharp curving of the extending portions 30 in directions toward the main frames 2. Accordingly, concentration of stress due to stiffness variation in the frame can be prevented.

Moreover, in the aforementioned embodiment, the rear end portion 6b of the lower frame 6 is separable from the pivot portion 5 of the main frame 2, and the joining portion 5d between the rear end portion 6b of the lower frame 6 and the pivot portion 5 is covered with the step supporting member 51 in the side view. This makes the joining portion 5d between the rear end portion 6b of the lower frame 6 and the pivot portion 5 less visible in the side view, and the external appearance can be thereby improved.

Furthermore, in the aforementioned embodiment, the step supporting member 51 is fixed to both of the rear end portion 6b of the lower frame 6 and the pivot portion 5 of the main frame 2. This can improve the joining strength between the rear end portion 6b of the lower frame 6 and the pivot portion 5.

Moreover, in the aforementioned embodiment, the lower supporting portions 3c supporting the engine are formed in the extending portions 30. This can achieve reinforcement of the extending portions 30 which are overhangs of the main frames 2, with the engine in addition to the lower frames 6, thereby further improving the stiffness of the frame.

Note that, in the aforementioned embodiment, description is given of the example in which the steered axis C2 is arranged in front of and away from the steering axis C1 in the side view. However, the present invention is not limited to this example. For example, the steered axis C2 may be arranged behind and away from the steering axis C1 in the side view. In other words, it is only necessary that the steered axis C2 and the steering axis C1 are offset from each other in the front-rear directions in the side view. Moreover, the steered axis C2 and the steering axis C1 may coincide with each other in the side view.

Moreover, in the aforementioned embodiment, description is given of the example in which the steered axis C2 and the steering axis C1 are parallel to each other. However, the present invention is not limited to this example. For example, the steered axis C2 and the steering axis C1 may intersect each other.

Furthermore, in the aforementioned embodiment, the description is given of the example in which the first straight line AX1 of the upper arm 21 and the second straight line AX2 of the lower arm 22 are substantially parallel to each other. However, the present invention is not limited to this example.

For example, the first straight line AX1 and the second straight line AX2 can intersect each other in portions extending behind the upper arm 21 such that the distance between the first straight line AX1 of the upper arm 21 and the second straight line AX2 of the lower arm 22 increases toward the front side. In order to achieve such intersecting arrangement, for example, the position of the second connection axis C12 in the up-down directions is shifted downward or the position of the fourth connection axis C14 in the up-down directions is shifted upward in the side view.

Alternatively, the first straight line AX1 and the second straight line AX2 can intersect each other in portions extending in front of the upper arm 21 and the lower arm 22 such that the distance between the first straight line AX1 of the upper arm 21 and the second straight line AX2 of the lower arm 22 increases toward the rear side. In order to achieve such intersecting arrangement, for example, the position of the second connection axis C12 in the up-down directions is shifted upward or the position of the fourth connection axis C14 in the up-down directions is shifted downward in the side view.

Moreover, in the aforementioned embodiment, description is given of the example in which the first axes C4 are the straight lines extending in the vehicle up-down directions and the second axis C5 is the straight line substantially parallel to the first axes C4 and extending in the vehicle up-down directions. However, the present invention is not limited to this example. For example, the first and second axes C4, C5 may be such that the first axes C4 are straight lines extending in directions intersecting the vehicle width directions and the second axis C5 is a straight line extending in directions which intersect the vehicle width directions but are different from the directions of the first axes C4.

Note that the present invention is not limited to the aforementioned embodiment. For example, the saddle-ride type vehicle includes vehicles in general on which a driver rides by straddling on a vehicle body and includes not only motorcycles (including motored bicycles and scooter-type vehicles) but also three-wheel vehicles (including vehicles with two front wheels and one rear wheel in addition to vehicles with one front wheel and two rear wheel).

Moreover, the configuration in the aforementioned embodiment is one example of the present invention, and various changes such as replacing the constitutional elements in the embodiment with other well-known constitutional elements can be made within a range not departing from the spirit of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A front wheel supporting frame structure of a saddle-ride vehicle, comprising:
   a main frame which extends in vehicle front-rear directions; and
   upper and lower arms which extend in the vehicle front-rear directions and by which a front wheel is supported to be swingable in up-down directions,
   wherein the front wheel supporting frame structure further comprises:
      a lower frame extending forward in a vehicle lower portion from a rear portion of the main frame and then extending upward in a vehicle front portion,
      an upper connection portion to which a rear end portion of the upper arm is swingably connected is formed in an upper front portion of the main frame,
      an extending portion extending downward is formed in a lower front portion of the main frame,
      a lower connection portion to which a rear end portion of the lower arm is swingably connected is formed in the extending portion, and
      an upper front portion of the lower frame is connected to the extending portion,
   wherein a joining portion is formed in the extending portion, the joining portion being joined to the upper front portion of the lower frame using a fastener,
   wherein the joining portion is formed in a front portion of the extending portion, and
   wherein the upper front portion of the lower frame is joined to the joining portion by using the fastener configured to fasten the upper front portion in the vehicle front-rear directions.

2. The front wheel supporting frame structure of a saddle-ride vehicle according to claim 1, wherein the upper front portion of the lower frame is joined to the front portion of the extending portion.

3. The front wheel supporting frame structure of a saddle-ride vehicle according to claim 1, wherein
   the upper front portion of the lower frame is joined to the joining portion by using the fastener configured to fasten the upper front portion from a front side of the vehicle.

4. The front wheel supporting frame structure of a saddle-ride vehicle according to claim 3, wherein a plurality of the fasteners are provided to be offset from each other in the up-down directions and left-right directions in a front view.

5. The front wheel supporting frame structure of a saddle-ride vehicle according to claim 1, wherein
   a rear portion of the lower frame is separable from the main frame, and
   a second joining portion between the rear portion of the lower frame and the main frame is covered with a step supporting member in a side view.

6. The front wheel supporting frame structure of a saddle-ride vehicle according to claim 5, wherein the step supporting member is fixed to both of the rear portion of the lower frame and the main frame.

7. The front wheel supporting frame structure of a saddle-ride vehicle according to claim 1, wherein a supporting portion which supports an engine is formed in the extending portion.

8. A front wheel supporting frame structure of a saddle-ride vehicle, comprising:
   a main frame which extends in vehicle front-rear directions; and
   upper and lower arms which extend in the vehicle front-rear directions and by which a front wheel is supported to be swingable in up-down directions,
   wherein the front wheel supporting frame structure further comprises:
      a lower frame extending forward in a vehicle lower portion from a rear portion of the main frame and then extending upward in a vehicle front portion,
      an upper connection portion to which a rear end portion of the upper arm is swingably connected is formed in an upper front portion of the main frame,
      an extending portion extending downward is formed in a lower front portion of the main frame,
      a lower connection portion to which a rear end portion of the lower arm is swingably connected is formed in the extending portion, and
      an upper front portion of the lower frame is connected to the extending portion, and
   wherein the extending portion inclines toward a center in vehicle width directions as extending upward in a front view.

9. A front wheel supporting frame structure of a saddle-ride vehicle, comprising:
   a main frame which has a front portion and a rear portion opposite to the front portion in a vehicle front-rear direction, the main frame including an upper connection portion, a lower connection portion, and an extending portion, the upper connection portion being provided at an upper part of the front portion, the lower connection portion being provided at a lower part of the front portion, the extending portion extending downward from the lower connection portion;
   an upper arm which has an upper front end portion and an upper rear end portion opposite to the upper front end portion in the vehicle front-rear direction and which supports at the upper front end portion a front wheel to be movable in an up-down direction substantially perpendicular to the vehicle front-rear direction, the upper rear end portion of the upper arm being movably connected to the upper connection portion of the main frame;
   a lower arm which is provided under the upper arm, which has a lower front end portion and a lower rear end portion opposite to the lower front end portion in the vehicle front-rear direction, and which supports at the lower front end portion a front wheel to be movable in the up-down direction, the lower rear end portion of the lower arm being movably connected to the lower connection portion of the main frame; and
   a lower frame including a bottom portion and an upright portion which are connected at a corner portion, the bottom portion extending in the vehicle front-rear direction from the rear portion of the main frame to the corner portion, the upright portion having a top portion opposite to the corner portion in the up-down direction, the top portion being connected to the extending portion of the main frame, wherein a joining portion is provided in the extending portion, the joining portion being joined to the top portion of the upright portion using at least one fastener, wherein the joining portion is provided in a front portion of the extending portion, and wherein the top portion of the upright portion is joined to the joining portion by the at least one fastener configured to fasten the top portion of the upright portion in the vehicle front-rear direction.

10. The front wheel supporting frame structure of a saddle-ride vehicle according to claim 9, wherein the top portion of the upright portion is joined to the front portion of the extending portion.

11. The front wheel supporting frame structure of a saddle-ride vehicle according to claim 9, wherein
the top portion of the upright portion is joined to the joining portion by the at least one fastener configured to fasten the top portion of the upright portion from a front side of the vehicle.

12. The front wheel supporting frame structure of a saddle-ride vehicle according to claim 11, wherein
the at least one fastener includes a plurality of the fasteners, and
the plurality of the fasteners are provided to be offset from each other in the up-down direction and a left-right direction substantially perpendicular to the vehicle front-rear direction and the up-down direction in a front view.

13. The front wheel supporting frame structure of a saddle-ride vehicle according to claim 11, wherein the at least one fastener is covered with a side wall portion in a side view, the side wall portion being provided with the top portion of the upright portion.

14. The front wheel supporting frame structure of a saddle-ride vehicle according to claim 9, wherein
a rear portion of the lower frame is detachably connected to the main frame, and
a second joining portion between the rear portion of the lower frame and the main frame is covered with a step supporting member in a side view.

15. The front wheel supporting frame structure of a saddle-ride vehicle according to claim 14, wherein the step supporting member is connected to both of the rear portion of the lower frame and the main frame.

16. The front wheel supporting frame structure of a saddle-ride vehicle according to claim 9, wherein a supporting portion which supports an engine is provided in the extending portion.

17. The front wheel supporting frame structure of a saddle-ride vehicle according to claim 9, wherein the upper arm is substantially parallel to the lower arm.

18. A front wheel supporting frame structure of a saddle-ride vehicle, comprising:
a main frame which has a front portion and a rear portion opposite to the front portion in a vehicle front-rear direction, the main frame including an upper connection portion, a lower connection portion, and an extending portion, the upper connection portion being provided at an upper part of the front portion, the lower connection portion being provided at a lower part of the front portion, the extending portion extending downward from the lower connection portion;
an upper arm which has an upper front end portion and an upper rear end portion opposite to the upper front end portion in the vehicle front-rear direction and which supports at the upper front end portion a front wheel to be movable in an up-down direction substantially perpendicular to the vehicle front-rear direction, the upper rear end portion of the upper arm being movably connected to the upper connection portion of the main frame;
a lower arm which is provided under the upper arm, which has a lower front end portion and a lower rear end portion opposite to the lower front end portion in the vehicle front-rear direction, and which supports at the lower front end portion a front wheel to be movable in the up-down direction, the lower rear end portion of the lower arm being movably connected to the lower connection portion of the main frame; and
a lower frame including a bottom portion and an upright portion which are connected at a corner portion, the bottom portion extending in the vehicle front-rear direction from the rear portion of the main frame to the corner portion, the upright portion having a top portion opposite to the corner portion in the up-down direction, the top portion being connected to the extending portion of the main frame,
wherein the extending portion inclines toward a center in a vehicle width as extending upward in a front view.

19. A front wheel supporting frame structure of a saddle-ride vehicle, comprising:
a main frame which has a front portion and a rear portion opposite to the front portion in a vehicle front-rear direction, the main frame including an upper connection portion, a lower connection portion, and an extending portion, the upper connection portion being provided at an upper part of the front portion, the lower connection portion being provided at a lower part of the front portion, the extending portion extending downward from the lower connection portion;
an upper arm which has an upper front end portion and an upper rear end portion opposite to the upper front end portion in the vehicle front-rear direction and which supports at the upper front end portion a front wheel to be movable in an up-down direction substantially perpendicular to the vehicle front-rear direction, the upper rear end portion of the upper arm being movably connected to the upper connection portion of the main frame;
a lower arm which is provided under the upper arm, which has a lower front end portion and a lower rear end portion opposite to the lower front end portion in the vehicle front-rear direction, and which supports at the lower front end portion a front wheel to be movable in the up-down direction, the lower rear end portion of the lower arm being movably connected to the lower connection portion of the main frame; and
a lower frame including a bottom portion and an upright portion which are connected at a corner portion, the bottom portion extending in the vehicle front-rear direction from the rear portion of the main frame to the corner portion, the upright portion having a top portion opposite to the corner portion in the up-down direction, the top portion being connected to the extending portion of the main frame,
wherein a first length of the upper arm along the vehicle front-rear direction is substantially same as a second length of the lower arm along the vehicle front-rear direction.

20. A front wheel supporting frame structure of a saddle-ride vehicle, comprising:
- a main frame which has a front portion and a rear portion opposite to the front portion in a vehicle front-rear direction, the main frame including an upper connection portion, a lower connection portion, and an extending portion, the upper connection portion being provided at an upper part of the front portion, the lower connection portion being provided at a lower part of the front portion, the extending portion extending downward from the lower connection portion;
- an upper arm which has an upper front end portion and an upper rear end portion opposite to the upper front end portion in the vehicle front-rear direction and which supports at the upper front end portion a front wheel to be movable in an up-down direction substantially perpendicular to the vehicle front-rear direction, the upper rear end portion of the upper arm being movably connected to the upper connection portion of the main frame;
- a lower arm which is provided under the upper arm, which has a lower front end portion and a lower rear end portion opposite to the lower front end portion in the vehicle front-rear direction, and which supports at the lower front end portion a front wheel to be movable in the up-down direction, the lower rear end portion of the lower arm being movably connected to the lower connection portion of the main frame;
- a lower frame including a bottom portion and an upright portion which are connected at a corner portion, the bottom portion extending in the vehicle front-rear direction from the rear portion of the main frame to the corner portion, the upright portion having a top portion opposite to the corner portion in the up-down direction, the top portion being connected to the extending portion of the main frame; and
- a cushion member which is expanded and compressed with a movement of the front wheel to obtain a cushioning effect, and
- wherein the cushion member is directly connected to the lower arm.

* * * * *